United States Patent

[11] 3,559,956

| [72] | Inventor | Joseph B. Gray |
| | | Wilmington, Del. |
| [21] | Appl. No. | 732,212 |
| [22] | Filed | May 27, 1968 |
| [45] | Patented | Feb. 2, 1971 |
| [73] | Assignee | E. I. du Pont de Nemours and Company |
| | | Wilmington, Del. |
| | | a corporation of Delaware |

[54] PLANETARY GEAR MIXER
3 Claims, 4 Drawing Figs.

| [52] | U.S. Cl. | 259/5 |
| [51] | Int. Cl. | B01f 7/14 |

[50] Field of Search............................................. 259/5, 21, 40, 64, 102, 118, 129

[56] References Cited
UNITED STATES PATENTS
| 3,443,798 | 5/1969 | Overcashier et al. | 259/5X |
| 3,362,793 | 1/1968 | Massoubre | 259/102 |

Primary Examiner—William I. Price
Attorney—Harry J. McCauley

ABSTRACT: A planetary gear mixer having multiple sets of mixing gears offset one set from another circumferentially to eliminate longitudinal leakage paths therethrough.

PATENTED FEB 2 1971

3,559,956

INVENTOR
Joseph B. Gray
BY
Harry J. McCauley
ATTORNEY

3,559,956

PLANETARY GEAR MIXER

BRIEF SUMMARY OF THE INVENTION

Generally, this invention comprises a planetary gear mixer having a housing provided with a cylindrical bore in open communication at the ends with a supply port and a discharge port, respectively, for throughput of material to be mixed, a drive pinion mounted longitudinally axial of the cylinder in concentric relationship with respect to a stationary internal gear fixed in tight abutment with the periphery of the bore and a multiplicity of sets of mixing gears meshed with and interposed between the drive pinion on the one hand and the internal gear on the other hand, the mixing gears of any given one of the sets being arranged in a common plane transverse the bore, and longitudinally adjoining sets of the mixing gears being offset one from another angularly circumferentially of the drive pinion in a preselected arrangement pattern

DRAWINGS

The following drawings detail the construction and operation of two preferred embodiments of this invention, as to which:

Figures 1, 2, 3, 4:
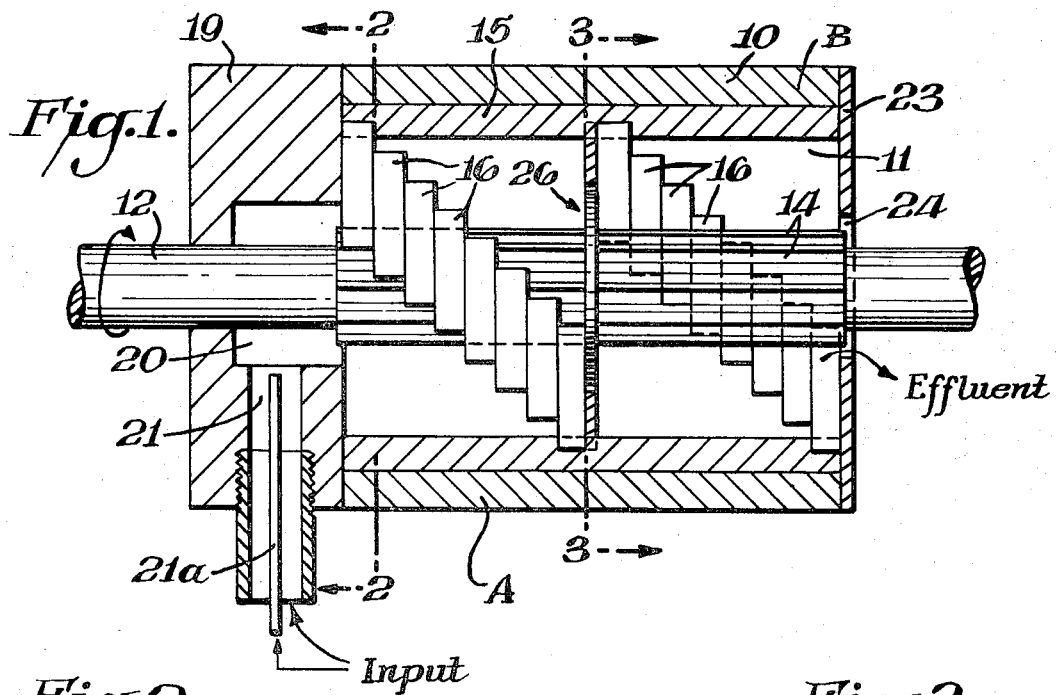
FIG. 1 is a partially schematic longitudinal section view of a mixer according to this invention wherein successive mixing gear sets are arranged in progressive angularly offset disposition axially to present a generally helical mixing gear pattern, some of the gears being omitted from the showing for purposes of clarity.
FIG. 2 is a transverse section on line 2—2, FIG. 1.

FIG. 3 is a section on line 3—3, FIG. 1, showing a perforated baffle which is an optional accessory for the mixer of FIGS. 1 and 2; and FIG. 4 is a transverse section similar to that of FIG. 2, but in reverse orientation axially, of a second embodiment of this invention wherein successive mixing gear sets (the gear teeth of which are omitted from the showing) are disposed at equal angular offsets alternately in reverse relationship one to another.

DETAILED DESCRIPTION

Referring to FIGS. 1—3, inclusive, a preferred embodiment of mixer according to this invention comprises a heavy casing 10 provided with a cylindrical bore 11 within which is journaled, concentric with the bore, a drive pinion 12 (as sun gear) machined with splinelike gear teeth 14 over substantially the full length internal casing 10.

A stationary internal or ring gear 15 of the same tooth size as drive pinion 12 is keyed or otherwise secured in fixed telescopic disposition within casing 10, and equal thickness planetary mixing gears 16 are interposed at equal angular separations within the annular space between drive pinion 12 and ring gear 15, four such equidistant gears being shown in FIG. 2. The mixing gears 16 of any one set, as seen in FIG. 2, are disposed in a common plane. The thickness of mixing gears 16 is kept as small as practicable, consistent with structural strength requirements and preferably have proportions expressed in ratios of axial length to pitch diameter in the range of about 1:1 to 0.1:1.

The improvement of this invention resides in the arrangement of adjoining sets of mixing gears 16 disposed within any given transverse plane at angular offsets differing one from another as viewed axial of the mixer apparatus, so as to bar bypass paths for material fed through casing 10 and, at the same time, effect preselected flow patterns for process material during the mixing transit.

Thus, in the apparatus of FIGS. 1 and 2, successive sets of mixing gears 16 are offset angularly an equal amount progressively in the same direction (e.g., counterclockwise with reference to FIG. 2), so that gears 16 lie along a generally helical course, as seen for the left-hand section of the apparatus, denoted A, in FIG. 1, which disposition is preferably repeated, but in a reverse helical direction for the next-following section B.

It will be understood that adjacent sets of mixing gears 16 abut tightly at their confronting ends, so that the longitudinal forces of the process material imposed on them are transmitted to plate 23 hereinafter described.

The apparatus of FIG. 1 is provided with a heavy closure head 19 cored out centrally at 20 to present an axial passage in open communication with bore 11 and fitted with a radial supply port 21 for the introduction of material to be mixed. It is often convenient to supply the process materials separately, and open conduit 21a, concentrically mounted with respect to port 21, is utilized for the apparatus of FIG. 1 to introduce the low viscosity component which it is desired to mix.

Shaft 12 extends outboard of head 19 and is power-driven by a heavy industrial motor (not shown). The right-hand end of casing 10 is closed by an annular plate 23 encircling the right-hand end of shaft 12 with a clearance large enough (typically, 0.1 times the pitch diameter of the ring gear, measured radially) to define a central discharge port 24 through which the mixed product escapes into a suitable collection receptacle not shown. Alternatively, drive pinion 12 can be terminated at plate 23 and a conduit connected in continuation of discharge port 24 to direct the mixer effluent downstream.

It is preferred, although optional, to interpose a perforated baffle plate, denoted generally at 26, of a design such as that detailed in FIG. 3 between the connecting ends of sections A and B. The purpose of such a baffle plate is to redistribute the product laterally to at least some extent before delivery to the next mixing section in series.

As shown, baffle 26 can be of two-part construction comprising a central rotatable smaller diameter element 26a machined internally with teeth 27 adapted to mesh with drive pinion teeth 14 and an exteriorly surrounding stationary annulus 26b machined with teeth 28 on the outside periphery adapted to mesh with ring gear 15. The faces of element 26a and annulus 26b are provided with a multiplicity of regularly distributed drilled-through passages 30 (typically, 0.02 times the pitch diameter of ring gear 15) so as to present enough resistance to product passage to insure that appreciable lateral deflection of product is obtained before delivery from one mixer stage to the next. The radial clearance 31 between element 26a and annulus 26b can also typically be 0.02 times the pitch diameter of ring gear 15, or the two members can even be in sliding contact, in which case the confronting surfaces should be finished to appropriate smoothness.

A second embodiment of apparatus presenting a more tortuous path to process material is that shown as to mixing gear disposition only in FIG. 4, the drawing being simplified by representing intermeshing gears in tangent relationship one to another with all gear teeth omitted. Here the arrangement pattern of the mixing gears 16 of adjacent sets is repeated for each pair of mixing gear sets, so that each following set of mixing gears is offset angularly, either clockwise or counterclockwise, as required, in order that the gears of this set are disposed longitudinally intermediate the mixing gears of the immediately preceding set. Thus, where there are five mixing gears 16a as a first set in a common plane separately engaged with drive pinion 12 and ring gear 15 at equal angular spacings 72° apart, the gears 16b of the next-following set are offset individually exactly 36° clockwise from their counterparts in the first set so as to lie across the interspaces between the gears of the first set. This pattern of disposition is then repeated exactly for all other pairs of mixing gear sets. The material in process is, in this construction, subdivided and recombined repeatedly while it flows past the mixing gears.

The dimensional characteristics of mixers constructed according to this invention can vary widely and can thus be chosen to suit apparatus strength requirements and also the mixing action desired to be exerted by tooth contact on a particular system to be mixed.

Conventional involute-toothed, internal, mixing (spur) and pinion gears with a four to 24 diametral pitch can be used as a basis for design and fabrication of my planetary gear mixer.

Generally speaking, the ratio of pitch diameters of drive pinion 12 to mixing gears 16 should be in the range of about 0.5 to 10. Mixing gear sets can vary in number from about four to 40 per mixer section A or B. and the angle between a tangent at a point on the helix defined by gears 16 and the plane through this point inclusive of the longitudinal axis of pinion 12 can range up to about 60°

In practice, continuous mixing of materials having widely different viscosities is difficult. Commercial examples are the dissolving of molten polyamides, polyesters or polyolefins in solvents in order to make foamed products. The lower viscosity component in such systems acts somewhat as a lubricant, permitting the higher viscosity material to slide at equipment surfaces. This reduces the forces which can be imposed on the viscous material, thereby reducing the rate of its deformation, thus lowering the rate of mixing with a less viscous component. In fact, this phenomenon can be visually observed at the cylindrical mixer body wall for either a continuous helical ribbon design of apparatus or for a torpedo mixer. Moreover, the charge in these mixers closest to the shaft axis of rotation is relatively stagnant, making circulation of material in this region particularly poor with highly plastic or pseudoplastic materials.

Planetary gear mixers are effective in overcoming the foregoing difficulty, because the shear rates and shear stresses applied to the process material adjacent to all equipment surfaces are adequate to move the process material toward and away from these surfaces frequently and rapidly, even at relatively low drive pinion 12 rotational speeds.

The apparatus of this invention retains this advantage of high tooth pressures but, at the same time, eliminates bypassing of material in process and also preserves a preselected path of material throughput which effects lateral deflection of substreams, thereby breaking up striations rapidly and completely.

A test apparatus was fabricated pursuant to the design of FIG. 1 having the planetary mixing gears 16 disposed in a helical pattern. The mixing gears, in this instance, were 13.5 diametral pitch spur gears of 0.667 inches pitch diameter, arranged four to a set, as shown in FIG. 2, around a 0.667 inch pitch diameter drive pinion 12, the gear thickness being ⅜inch uniformly and there being eight sets of the gears defining, collectively, a 3 inch length helix of 50° angle between a tangent drawn to a point thereon and the plane through this point inclusive of the drive pinion 12 longitudinal axis.

The test apparatus had a 2 inch pitch diameter ring gear 15 and an internal length of 3 inches for section A of FIG. 1 plus an additional 3 inch length, with reversed direction of helix pitch, for section B.

A test was conducted in which 12 lbs./hr. of a viscous component, in this case 8,000 poise corn syrup, introduced under pressure via supply port 21, was mixed with 0.67 lb./hr. of water supplied under pressure via conduit 21a.

It was observed that a striation-free uniformly mixed 1,000 poise effluent product was obtained from discharge port 24 at a drive shaft speed of 34 r.p.m., accompanied by a temperature rise of 4° C. and a pressure drop through the mixer of 15 p.s.i.

With the planetary gears aligned longitudinally, in the manner of a conventional planetary gear mixer, a speed of 46 r.p.m. was necessary to obtain a striation-free product, and the temperature rise was 8° C.

It is evident from this test that the respective temperature rises are proportional to the power expenditures for the two apparatuses involved, under which circumstances the helical arrangement required half the power that the straight gear construction did for the same mixing quality.

Similar tests on the same corn syrup-water system were made using a 2 inch dia., 9 inches long, three-stage helical ribbon mixer, whereupon a speed of 70 r.p.m. with an accompanying temperature rise of 11° C. was necessary to achieve a uniform striation-free product.

If a highly plastic or pseudoplastic viscous material had been employed instead of the Newtonian corn syrup, the difference in performance between the helical planetary gear and the helical ribbon mixers would have been markedly greater, since there are no unscraped surfaces in the planetary gear mixer.

In addition to the dissolving of high viscosity polymers in low viscosity solvents, apparatus according to this invention has special merit in the mixing of components which tend to foul equipment surfaces, when mixing pigment concentrates into polymer melts or solutions, or when homogenizing gel particles in polymer melts or solutions, to mention but a few applications.

Many other mixing gear arrangement patterns are, of course, possible beside the helical and alternately staggered embodiments hereinbefore described and these are readily achieved by quick assembly wherein the interrelated positioning of the planetary mixing gears is completely variable in angular offset while being aided by the guidance afforded by the mating teeth of the surrounding ring gear 15 and the central drive pinion 12.

Moreover, any convenient number of mixing gears 16 per set can be employed, the numbers four (FIG. 2) and five (FIG. 4) detailed herein being chosen as examples only.

From the foregoing, it will be understood that this invention can be varied relatively widely without departure from its essential spirit, and it is accordingly intended to be limited only by the scope of the following claims.

I claim:

1. A planetary gear mixer comprising, in combination, a housing provided with a cylindrical bore in open communication at the ends with a supply port and a discharge port, respectively, for throughput of material to be mixed, a drive pinion mounted longitudinally axial of said cylinder in concentric relationship with respect to a stationary internal gear fixed in tight abutment with the periphery of said bore and a multiplicity of sets of mixing gears meshed with and interposed between said drive pinion on the one hand and said internal gear on the other hand, said mixing gears of any given one of said sets being arranged in a common plane transverse said bore and longitudinally adjoining sets of said mixing gears being offset one from another angularly circumferentially of said drive pinion in a preselected arrangement pattern.

2. A planetary gear mixer according to claim 1 wherein said preselected arrangement pattern constitutes a progressive offset of said longitudinally adjoining sets of said mixing gears angularly circumferentially of said drive pinion in the same direction to present a generally helical flow course to material passed through said mixer.

3. A planetary gear mixer according to claim 1 wherein said preselected arrangement pattern constitutes an offset of said longitudinally adjoining sets of said mixing gears angularly circumferentially of said drive pinion in alternate directions for successive pairs of said longitudinally adjoining sets of said mixing gears.